No. 618,801. Patented Jan. 31, 1899.
G. F. OWEN.
ACETYLENE GAS GENERATOR.
(Application filed Mar. 4, 1898.)
(No Model.) 2 Sheets—Sheet 2.
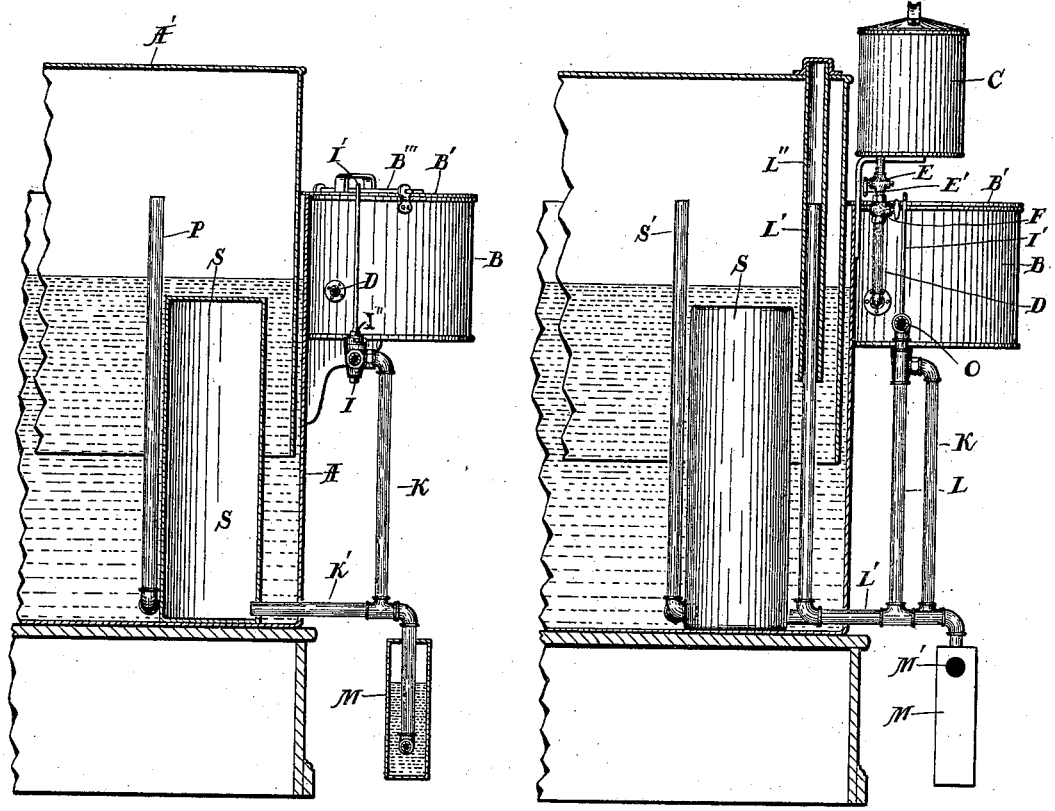
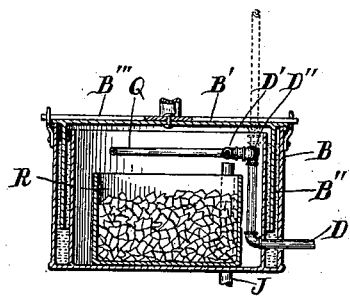
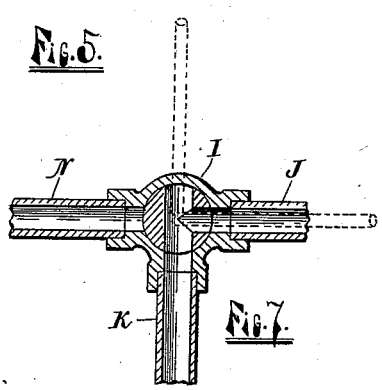
WITNESSES:
George Holloway
Ella P. Wood
INVENTOR
George F. Owen
By Moulton & Flanders
Attorneys.
THE NORRIS PETERS CO., PHOTO-LITHO., WASHINGTON, D. C.

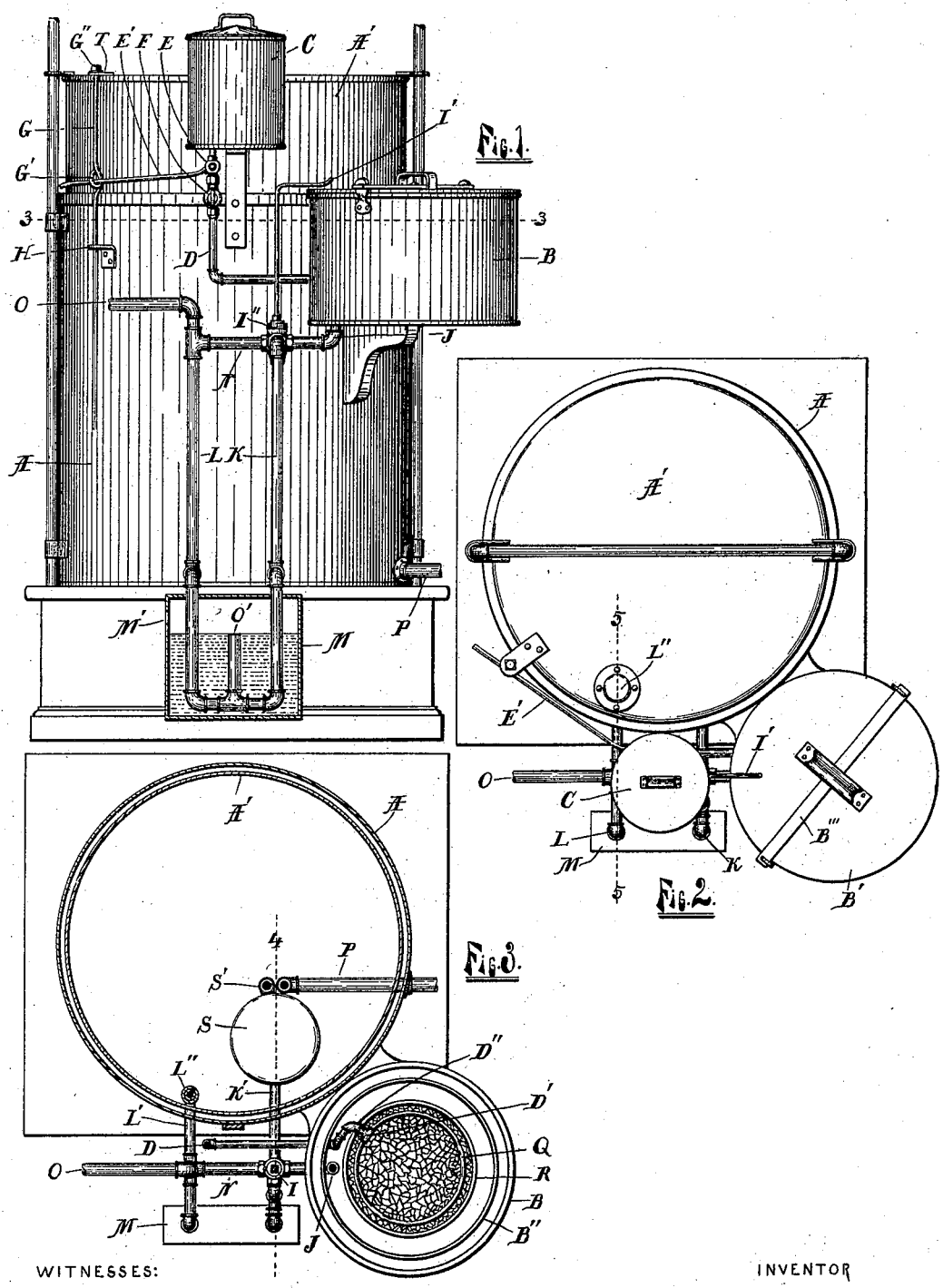

UNITED STATES PATENT OFFICE.

GEORGE F. OWEN, OF GRAND RAPIDS, MICHIGAN.

ACETYLENE-GAS GENERATOR.

SPECIFICATION forming part of Letters Patent No. 618,801, dated January 31, 1899.

Application filed March 4, 1898. Serial No. 672,512. (No model.)

*To all whom it may concern:*

Be it known that I, GEORGE F. OWEN, a citizen of the United States, residing at Grand Rapids, in the county of Kent and State of Michigan, have invented certain new and useful Improvements in Acetylene-Gas Generators; and I do hereby declare the following to be a full, clear, and exact description of the invention, such as will enable others skilled in the art to which it appertains to make and use the same.

My invention relates to improvements in acetylene-gas generators; and its object is to provide the same with certain new and useful features hereinafter more fully described, and particularly pointed out in the claims, reference being had to the accompanying drawings, in which—

Figure 1 is a side elevation of a device embodying my invention with the drip-tank in vertical section; Fig. 2, a plan view of the same entire; Fig. 3, a longitudinal section of the same on the line 3 3 of Fig. 1; Fig. 4, a detail in vertical section on the line 4 4 of Fig. 3; Fig. 5, a detail in vertical section on the line 5 5 of Fig. 2; Fig. 6, a detail of the generator in vertical section, and Fig. 7 an enlarged detail of the three-way valve in horizontal section.

Like letters refer to like parts in all of the figures.

A represents the water-tank, and A' the vertically-movable bell of the gas-receiver. B is the gas-generator, supported upon the side of the tank A, and C is a water-tank supported at a higher level than the generator B.

D is a pipe leading from the tank C to the upper part of the interior of the generator B and provided with a T D' on its inner end, in which T is inserted the ends of a pipe Q, bent in ring form and having lateral perforations for the escape of water. By means of two elbows and a nipple a universal joint D'' is formed in the pipe D, whereby the pipe Q may be adjusted or turned up out of the way to permit of the removal of the vessel R. Said vessel is adapted to contain the carbid and is located beneath the pipe Q and within the generator B. The generator is provided with double walls having a water-space between them, into which dips a flange B'' on the removable cover B'. Said cover is thus provided with a water-seal joint and is secured in place by a clamping-bar B'''.

In the interior of the generator B is a pipe J, extending vertically to some distance from the bottom thereof, being open at the upper end and extended thence through the bottom of the generator B and laterally to three-way valve I, having a laterally-bent operating-rod I', arranged so that when the valve is in the position shown in Fig. 7 the end of said rod will be over the top of the generator B. The movement of the valve is limited by a stop-pin I'' to prevent connecting the pipes N and K. A pipe K extends downward from one exit-port of said valve to the bottom of the drip-tank M, thence horizontally within the same, and thence by way of the pipe L upward to the level of the valve I, where a branch pipe N connects it with the other exit-port of the valve I, and a discharge-pipe O extends from this point to the open air. O' is a lateral pipe from said horizontal portion extending vertically within the drip-tank and open at the top.

M' is an overflow-opening in the tank M.

P is a pipe to convey gas to the burners, extending from above the water in the tank A and through the side of the same near the bottom, and thence to the burners.

Above the drip-tank M a branch pipe K' extends horizontally into the tank A, near the bottom thereof, and opens into the bottom of a cooling-cylinder S, immersed in the water within the tank A and having a vertical outlet-pipe S' extending from the bottom thereof to a point above the water-level. From the pipe L extends a branch pipe L' into the interior of the tank A, and thence upward, terminating above the water-level in said tank and open at the upper end. Surrounding the pipe L' is a vertically-movable tube L'', closed at the top and open at the bottom and attached to the bell A' and moving with the same.

F is a stop-cock for positively cutting off the flow of water from the tank C to the generator B.

E is a stop-cock automatically operated by a lever E'.

T is an arm attached to the bell A' and provided with an opening, in which is a vertically-movable rod G, having a loop G', surrounding the lever E, and a head G'' to engage the arm T, and said rod is extended downward and vertically movable in an opening in the bracket H on the side of the tank A.

The operation of my device is as follows: As the bell A' descends the lever E' and rod G are lowered, and thus turn the stop-cock E to open position, and as the loop G' engages the bracket H the rod slides upward in the arm T and permits the bell A to descend to its lowest position. As the gas is generated it passes into the cooler S through the pipes J K K' and valve I, and, rising in said cooler, is cooled by contact with its sides, and the water carried over with the gas is condensed, which water flows through the pipe K' into the part of the pipes within the drip-tank and forms a water seal therein and prevents the flow of gas therethrough, the excess of water escaping by the openings O' and M'. By the use of said tank I prevent any danger of siphoning the water out of these lower pipes. The cooled gas falls to the bottom of the cooler S and escapes by the pipe S' into the bell A' and raises the same. As the head G'' engages the arm T the rod G and lever E' are raised thereby and the stop-cock E turned to closed position, thus cutting off the flow of water to the generator and stopping the generation of gas. If the bell rises sufficiently to lift the tube L'' clear of the water, the gas will escape into the lower end of the said tube and thence through the pipes L', L, and O to the open air, and thus prevent overcharging the receiver. The escaping gas tends to carry some water with it into the pipe L'. This water flows downward and escapes through the pipe O', which thus serves as a water trap and seal for both pipes K and L. To remove the cover of the generator, it is necessary to turn the end of the rod I' away from above the same. This insures the turning of the three-way valve, whereby the passage between the generator and the receiver is cut off and the branch pipe N is opened, forming a passage from the generator to the open air. This retains the gas in the receiver and allows the gas in the generator to escape into the open air before the cover is removed. By turning the ring Q upward the carbid-holder R can readily be removed for emptying and refilling.

Having thus fully described my invention, what I claim, and wish to secure by Letters Patent, is—

1. The combination of a generator, a receiver, and a cooler, a pipe from the generator to the cooler, a three-way valve between the generator and cooler, a passage from the said valve to the open air, and a water-trap between said valve and the cooler, substantially as described.

2. The combination of a gas-receiver, a generator, a pipe from the interior of the generator to a three-way valve, a pipe extending downward from said valve and thence laterally and upward alongside of said valve and to the open air, an open branch extending upward from the lower part of said pipe to form a water-stop and overflow in said pipe and a branch pipe between said water-stop, and the three-way valve extending to the interior of said receiver, substantially as described.

3. The combination of a generator, a receiver consisting of a water-tank having a vertically-movable bell, a vertical escape-pipe in said tank, a tube depending from the bell and surrounding the escape-pipe, a cooler, a pipe connecting the generator and cooler a three-way valve in said pipe a branch pipe from said valve to the escape-pipe, a U-shaped pipe connecting the escape-pipe and the pipe to the cooler and a stand-pipe projecting upward from the U-shaped pipe and open at the top substantially as described.

4. The combination of a generator, a tank having a vertical escape-pipe, and a vertically-movable bell having a tube attached and loosely surrounding said escape-pipe, a pipe extending from the generator to the interior of the tank a U-shaped pipe connecting the escape-pipe and the last-named pipe, an open stand-pipe in the U-shaped pipe, and a tank inclosing the stand-pipe and U-shaped pipe, and having an overflow-opening substantially as described.

5. The combination of a gas-receiver having a water-tank, and a vertically-movable bell therein, a generator near the top of said tank, a pipe extending downward from said generator thence laterally and thence upward to the open air, an overflow and water seal in the lower part of said pipe, a three-way valve near the generator, a branch from the three-way valve to the open air, a cooler in the water-tank of the receiver, a pipe from the cooler to the interior of the bell, a pipe from between the water seal and the three-way valve to the bottom of the cooler, a branch pipe from the open-air pipe to the interior of the tank and thence vertically upward to above the water-level and a tube attached to the bell and surrounding the said vertical pipe, said tube being open at the bottom and closed at the top, substantially as described.

In testimony whereof I affix my signature in presence of two witnesses.

GEORGE F. OWEN.

Witnesses:
 LEWIS E. FLANDERS,
 LUTHER V. MOULTON.